United States Patent Office 3,324,200
Patented June 6, 1967

3,324,200
CATALYTIC POLYMERIZATION OF UNSATURATED, POLYMERIZABLE COMPOUNDS WITH CATALYSTS COMPRISING ADDUCTS OF PHOSPHOROUS ESTERS WITH α-DIKETONES
Horst Leithäuser, Marl, Germany, assignor to Chemische Werke Huls Aktiengesellschaft, Marl, Germany, a corporation of Germany
No Drawing. Filed Oct. 22, 1965, Ser. No. 502,278
Claims priority, application Germany, Apr. 2, 1963, C 29,544; Nov. 20, 1964, C 34,425
3 Claims. (Cl. 260—865)

My application Ser. No. 339,356, filed Jan. 22, 1964, now Patent No. 3,285,994, relates to a process for the catalytic polymerization of unsaturated polymerizable compounds involving the use of an initiator system which is an adduct of an oxygen-containing compound of trivalent phosphorus with up to an equal molecular equivalent, based upon said phosphorus compound, of an α-diketone. Said adduct can be used alone or together with a peroxidic catalyst. The initiator system is used in an amount within the range from 0.01 to 30 and preferably within the range from 0.02 to 12% by weight based upon the weight of the polymerizable compound.

Oxygen-containing compounds of trivalent phosphorus, suitable for the initiator system are the mono-, di- and triesters of the phosphorous acid (I), the mono- and diesters of the phosphonous acid (II), and the esters of the phosphinous acid (III). They are employed together with preferably equimolecular quantities of an α-diketone of the Formula IVa or IVb.

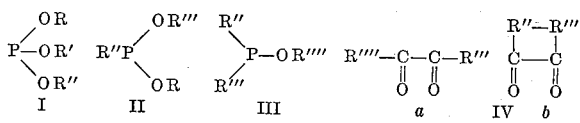

In the above formulae R and/or R' represent hydrogen or alkali metal or alkyl, aryl, cycloalkyl or aralkyl;
R", R''', R'''': are identical or dissimilar aliphatic, cycloaliphatic, aromatic or araliphatic residues which may be halogenated or jointly may be part of a ring.

It has now been found that esters, nitriles and amides of unsaturated acids, vinyl aromatic compounds and mixtures of esters of unsaturated acids with vinyl aromatic compounds can be catalytically polymerized by mixing the polymerizable composition under polymerization conditions with an initiator which is an adduct within the range from 1:1 to 1:2 produced by reacting in a molecular ratio within the range from 1:1 to 1:4 a carbonyl compound selected from the group consisting of α-diketones, ketones and aldehydes with a 1:1 adduct of the general formula

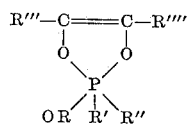

in which R stands for a member selected from the group consisting of hydrogen, alkali metals, and alkyl, cycloalkyl, aryl and aralkl groups which may be halogenated, R' stands for a member selected from the group consisting of alkyl, cycloalkyl, aryl, aralkyl and OR groups which may be halogenated, R" stands for a member selected from the group consisting of the alkyl, cycloalkyl, aryl, aralkyl, O-alkyl, O-cycloalkyl, O-aryl and O-aralkyl groups which may be halogenated, R''' and R'''' each stands for a member selected from the group consisting of the alkyl, cycloalkyl, aryl and aralkyl groups which may be halogenated, and in which the pairs R' and R" and R''' and R'''' may belong to the same ring, at least one of R, R' and R" being such a group as will assure that the compound of said general formula is an ester.

An example of a suitable initiator in accordance with the invention is the α-diketone adduct obtainable as described in J. Am. Chem. Soc., 84 (1962), pages 1317–1318, by adding an α-diketone such as diacetyl in a three-fold molecular excess dropwise to, e.g., triethylphosphite at room temperature with stirring and under an atmosphere of nitrogen and then continuing the stirring under the same conditions for a time and then separating the excess of the carbonyl compound from the reaction mixture by vaporization under vacuum.

If one starts with the preformed 1:1-α-diketone adduct, one then adds the α-diketone, ketone or aldehyde with stirring under nitrogen at 20–25° C. until one attains a molecular ratio of adduct to carbonyl compound within the range from 1:1 to 1:4, preferably 1:3.

One may also make the 1:1 adduct in the usual way and then without isolating it react it as described above.

In instances in which color (e.g., diacetyl) or odor (e.g., diacetyl, acetaldehyde, benzaldehyde) may be objectionable a smaller amount of the carbonyl compound preferably is used corresponding to the 2:1 adduct. Otherwise the amount of carbonyl compound is so chosen that the action of the resulting initiator system gives the desired polymerization result.

Examples of suitable unsaturated polymerizable compounds are hydrocarbons, esters, ethers, nitriles and amides which contain at least one polymerizable double bond, also mixtures known as unsaturated polyester resins of unsaturated polyesters with compounds that are polymerizable thereto and other mixtures of polymerizable compounds that are capable of mixed polymerization. Examples that may be named are styrene, vinyltoluene, divinylbenzene, methacrylic acid methyl ester, methacrylic acid ethyl ester, methacrylic acid butyl ester, acrylonitrile, tert. butylacrylamide, and especially mixtures of these vinyl compounds with unsaturated polyesters of e.g., maleic acid, fumaric acid, itaconic acid with glycols such as ethylene glycol, 1,3-propylene glycol and 2-ethylhexane diol.

In the following examples unless otherwise specified commercial unsaturated polyester resin, which have a viscosity of 11P according to the German industrial standard No. 53015 and which contain styrene as the monomer polymerizable thereto, are used. The unsaturated polyester resins are referred to hereinafter in the usual manner by the abbreviation UPER.

The adducts V–VIII referred to in the following examples were prepared as described above from
(1) Diacetyl and triethylphosphite (adduct V);
(2) Diacetyl, pentanedione-(2,3) and triethylphosphite (adduct VI);
(3) Diacetyl and phenylphosphonous acid - bis - (1-chloro-iso-propyl ester) (adduct VII);
(4) Diacetyl, benzaldehyde and triethylphosphite (adduct VIII).

Example 1a 0.2 g. of benzoylperoxide paste (50%) was added to 9.5 g. of UPER and then 0.5 g. of adduct V was added. The mixture gelled after being stirred at room temperature for about 8 minues. A hard test body was produced by heating at 80° C.

Example 1b

The same mixture as in Example 1a with the benzoyl peroxide omitted gelled in 20 minutes and heating at 80° C. gave an even harder test body.

Example 2

9.5 g. of UPER and 0.2 g. of benzoylperoxide paste were stirred together at room temperature. 0.5 g. of adduct VI was added and the resulting mixture gelled in 12 minutes. A hard, clear test body was produced by heating at 80° C.

Example 3

5% by weight of adduct VII was added to a UPER and the mixture gelled in 3 minutes. The gel was heated at 80° C. giving a hard, clear test body. When the same amount of adduct VII was added to a mixture of UPER and 2% of benzoylperoxide paste (50%) the resulting mixture gelled immediately.

Example 4

0.5 g. of adduct VIII was added to 10 g. of UPER. The mixture gelled after being stirred at room temperature for 4 hours. By heating at 80° C. a clear, hard, non-sticky test body was produced.

Example 5

10 g. of UPER, 0.2 cc. of cobalt naphthenate solution (20%) and 0.4 cc. of cyclohexanone peroxide (50%) were stirred at room temperature. 0.5 g. of adduct V was added and the mixture gelled immediately and hardened to a clear, non-adhesive test body. Adduct VIII was substituted for adduct V in a similar mixture and the resulting mixture gelled in 6 minutes and also hardened to a clear, non-adhesive test body.

Example 6

0.5 g. of adduct V was added to 10 g. of a flame resistant unsaturated polyester resin (styrene content: 25%; stabilizer concentration: 0.02% hydroquinone; composition of polyester: 1 mol of 1,4,5,6,7,7-hexachloro-bicyclo-[2,2,1] - 5 - heptene - 2,3 - dicarboxylic acid anhydride, 1 mol of fumaric acid, 1.05 mol of glycol and 1.05 mol of diglycol). The mixture gelled at room temperature in 5 minutes. At 80° C. the mixture formed a hard, clear, non-adhesive test body. A similar sample with adduct VIII as the initiator gelled in 79 minutes. This also upon heating at 80° C. gave a hard, clear, non-adhesive test body.

Example 7

0.2 g. of benzoylperoxide paste (50%) was added to 10 g. of the unsaturated polyester resin of Example 6 and then 0.5 g. of adduct V was added. The mixture gelled at room temperature in 3 minutes. At 80° C. it gave a hard, clear, non-adhesive test body.

Example 8

0.2 cc. of cobalt naphthenate solution (20%) and 0.4 cc. of cyclohexanon-peroxide (50%) were added to 10 g. of the unsaturated polyester resin of Example 6. Upon the further addition of 0.5 g. of adduct VIII the mixture gelled at room temperature in 15 minutes and hardened to a clear, non-adhesive test body. In a similar test adduct V was substituted as the initiator and the mixture gelled immediately and hardened equally smoothly.

Example 9

9 parts by weight of acrylonitrile were treated under nitrogen at 50° C. with 1 part by weight of adduct V. After about 30 minutes the polymer began to separate. After several hours the reaction was practically complete. A comparative sample without adduct remained unchanged.

In other polymerization experiments under otherwise similar conditions except the addition of 0.1 part of benzoyl peroxide (50%) the polymer began to separate after about 30 minutes. After about 1 hour spontaneous polymerization took place with partial decomposition.

In similar texts without adduct addition but with benzoyl peroxide the polymer began to separate only after about 1 hour and the spontaneous poylmerization occurred after about 1 hour and 20 minutes.

Example 10

Mixture of 67 parts of maleic acid monoallyl ester and 33 parts of styrene were treated under the conditions specified in the following table with adducts V to VIII and/or benzoyl-peroxide. The gelling times and the properties of the polymers are shown in the table.

TABLE I

| No. | Weight of Mixture | Weight of Adduct | Weight of benzoyl-peroxide | Gelling time, minutes | Remarks |
|---|---|---|---|---|---|
| 1 | 10 | | | | Not gelled in 4 hours. |
| 2 | 10 | | 0.2 | | Do. |
| 3 | 10 | 0.5, V | | 15 | Hardened at 80° C. |
| 4 | 10 | 0.5, VIII | | 46 | Do. |
| 5 | 10 | 0.5, V | 0.2 | 17 | Hardened completely at room temperature (exothermic). |
| 6 | 10 | 0.5, VIII | 0.2 | 43 | Hardened completely, strongly exothermic. |

Example 11

For the following tests shown in the following table α-diketone and triethylphosphite and a commercial unsaturated polyester resin (Vestopal H) based upon phthalic acid, fumaric acid and propylene glycol mixed with 33% by weight of styrene were used.

TABLE II

| No. | UPER, g. | Paste, g. BP[1] | Adduct, g. 1:1 | Adduct, g. 2:1 | Adduct, g. 1.5:1 | Gel. time, sec. | Remarks |
|---|---|---|---|---|---|---|---|
| 1 | 10 | 0.2 | | | | | Not gelled in 4 hrs. |
| 2 | 9.5 | | 0.5 | | | 145 | Weak heating. |
| 3 | 9.5 | 0.2 | 0.5 | | | 90 | Heating. |
| 4 | 9.5 | | | 0.5 | | 675 | |
| 5 | 9.5 | 0.2 | | 0.5 | | 370 | |
| 6 | 9.5 | | | | 0.5 | 425 | |
| 7 | 9.5 | 0.2 | | | 0.5 | 285 | Weak heating. |

[1] Benzoylperoxide paste (50%).

By heating at 80° C. test samples 2-7 gave hard, clear and colorless test pieces.

I claim:
1. Process for the catalytic polymerization of esters, nitriles and amides of unsaturated acids, vinyl aromatic compounds and mixtures of esters of unsaturated acids with vinyl aromatic compounds which comprises mixing the polymerizable composition under polymerization conditions with an initiator which is an adduct within the range from 1:1 to 1:2 produced by reacting in a molecular ratio within the range from 1:1 to 1:4 a carbonyl compound selected from the group consisting of α-diketones, ketones and aldehydes with a 1:1 adduct of the general formula

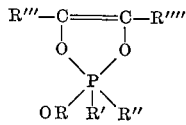

in which R stands for a member selected from the group consisting of hydrogen, alkali metals, and alkyl, cycloalkyl, aryl and aralkyl groups which may be halogenated, R' stands for a member selected from the group consisting of the alkyl, cycloalkyl, aryl, aralkyl and OR groups which may be halogenated, R" stands for a member selected from the group consisting of the alkyl, cycloalkyl, aryl, aralkyl, O-alkyl, O-cycloalkyl, O-aryl and O-aralkyl groups which may be halogenated, R''' and R'''' each stands for a member selected from the group consisting of the alkyl, cycloalkyl aryl and aralkyl groups which may be halogenated, and in which the pairs R' and R" and R''' and R'''' may belong to the same ring, at least one of R, R' and R" being such a group as will assure that the compound of said general formula is an ester.

2. Process as defined in claim 1 in which a peroxidic catalyst is added to the reaction mixture.

3. Process as defined in claim 1 in which the polymerizable composition is a mixture of an unsaturated polyester and a compound which is polymerizable thereto.

No references cited.

MURRAY TILLMAN, *Primary Examiner.*

J. T. GOOLKASIAN, *Assistant Examiner.*